Feb. 27, 1951     H. K. BRADFORD     2,543,715
APPARATUS FOR MEASURING ELECTRICAL CHARACTERISTICS
Filed Oct. 18, 1948     2 Sheets-Sheet 1

Inventor
Henry K. Bradford

Feb. 27, 1951     H. K. BRADFORD     2,543,715
APPARATUS FOR MEASURING ELECTRICAL CHARACTERISTICS
Filed Oct. 18, 1948     2 Sheets-Sheet 2

Inventor
Henry K. Bradford
By Ben. J. Chromy
His atty

Patented Feb. 27, 1951

2,543,715

UNITED STATES PATENT OFFICE 2,543,715

APPARATUS FOR MEASURING ELECTRICAL CHARACTERISTICS

Henry K. Bradford, Baltimore, Md.

Application October 18, 1948, Serial No. 55,166

4 Claims. (Cl. 175—183)

This invention relates to apparatus for the measurement of impedances in general. More particularly, this invention relates to a low frequency universal bridge circuit for the measurement of impedances.

An object of this invention is to provide a simple direct reading instrument adapted for the measurement of absolute impedance of a circuit or electrical device.

Another object of this invention is to provide a simple direct reading impedance bridge having an impedance arm of constant magnitude and variable in phase from plus 90° to minus 90° for the measurement of absolute impedance.

A further object of this invention is to provide a direct reading impedance measuring device for measuring an impedance of any phase angle and magnitude from one ohm to one megohm or more.

Other and further objects of this invention will be apparent to those skilled in the art to which it relates from the following specification, claims and drawing.

In accordance with this invention there is provided a simple direct reading impedance measuring device of the bridge type in which the standard arm is made variable only in phase angle while the variable arm is made variable in magnitude only. Thus, the phase of the standard arm is simply adjusted without changing the calibrations of the variable arm, to match any phase angle that the unknown impedance may have. Any magnitude of impedance of the variable impedance on the other hand may be matched within the decade range of the bridge by adjusting the variable resistance of the variable arm to the correct magnitude.

Other and further features of this invention will be apparent from the following specification and drawing in which briefly Figure 1 is a schematic wiring diagram of an embodiment of this invention;

Figure 1:
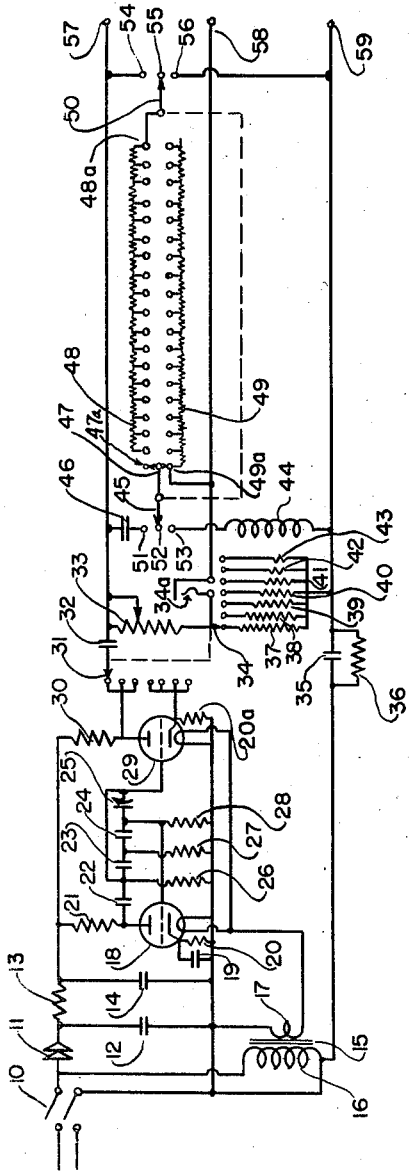

A complete schematic wiring diagram of the impedance bridge circuit is illustrated in Figure 1. This impedance bridge circuit is energized from the conventional 110 volt A. C. circuit through switch 10. Although it will of course be apparent that the bridge circuit may be energized from other sources of power either alternating or direct if desired and if direct current is used, then suitable changes will have to be made in the circuit as described hereinafter.

The alternating current supplied through the switch 10 is fed to the primary 16 of the transformer 15 that is provided with a filament heating secondary 17 for heating the cathodes of the tubes 18 and 29. Alternating current supplied through the switch 10 is also rectified by the rectifiers 11 which may be of the dry disc selenium type, or of the vacuum or gas discharge type commonly employed in radio apparatus. The output of the reactifier 11 is filtered by the filter consisting of the capacitors 12 and 14 and the resistor 13 so that filtered direct current is applied to the anodes and cathodes of the vacuum tubes 18 and 29. Positive potential is applied from the rectifier and filter to the anodes of the tubes 18 and 29 through the resistors 21 and 30 respectively. The negative terminal of the filter is connected to the cathodes of the tubes 18 and 29 through the resistors 20 and 20a respectively, the resistor 20 being shunted by a by pass capacitor 19.

The tubes 18 and 29 may be enclosed in one envelope if desired and may consist of the commercial type known as the 12AT7. These tubes are connected as a phase shift oscillator and amplifier to produce a current having a frequency of 1600 cycles at two output impedances. The tube 18 functions as the oscillator and the tube 29 functions as the amplifier. The anode of the tube 18 in addition to being connected to the anode resistor 21 is also connected to one terminal of the capacitor 22, the other terminal of this capacitor being connected to the upper terminal of the resistor 26, to one terminal of the capacitor 23, to one terminal of the variable capacitor 25 and to the control grid of the tube 29. The other terminal of the capacitor 23 is connected to the upper terminal of the resistor 27 and to one terminal of the capacitor 24. The other terminal of the capacitor 24 is connected to the control grid of the tube 18, to the upper terminal of the resistor 28 and to the other terminal of the variable capacitor 25. The lower terminals of all of the resistors 26, 27 and 28, are connected together to the negative terminal of the anode power supply and to the lower terminals of the cathode resistors 20 and 20a.

The frequency of the phase shift oscillator may be trimmed by the variable capacitor 25 so that the frequency may be set exactly on the desired value which in this case is 1600 cycles although it is obvious that other frequencies may be selected if desired.

The output of the amplifier tube 29, the input of which is supplied by the phase shift oscillator, is fed to the bridge circuit. For this purpose the anode of the tube 29 is connected to three contacts of the switch 31 and the cathode of this tube is connected to four contacts of this same switch. The contactor of the switch 31 is mechanically connected to the contactor of switch 34 although these two contactors are electrically insulated from each other. The switch 34 is also provided with seven contacts corresponding to the seven contacts of switch 31 so that as the contactors of these two switches are adjusted these contactors will contact corresponding ones of the contacts associated therewith.

The switch 34 is provided for the purpose of selecting different ones of the resistors 37, 38, 39, 40, 41, 42 and 43, the upper terminals of which are connected to the seven contacts of this switch. The lower terminals of these resistors are connected together to one terminal of the capacitor 35 and resistor 36 that is shunted across this capacitor 35. The other terminal of the capacitor 35 and the other terminal of the resistor 36 are connected to the negative terminal of the anode current supply of the oscillator 18 and the amplifier 29.

The contactor of the switch 34 is connected to the lower terminal of the resistor 33 and to one side of the jack 34a and the upper terminal of the resistor 33 is connected to the right hand side of the capacitor 32, to the upper terminal of the capacitor 46, to the contact 54 of the switch 50 and to the instrument terminal 57. The left hand side of the capacitor 32 is connected to the contactor of the switch 31. Thus the switches 31 and 34 select the correct decade resistor of the resistors 37 to 43 inclusive and a suitable impedance from the amplifier 29 working into the bridge circuit.

As previously described the variable resistor 33 is connected between the capacitor 32 and the contactor of the switch 34. This variable resistor comprises the main variable arm of the bridge circuit and the capacitor 46 and inductance 44 comprise the standard capacitative and inductive reactances respectively of the bridge circuit. These reactances may be selected by the switch 45 that is provided with three contacts 51, 52 and 53. The contact 51 is connected to the lower terminal of the capacitor 46; contact 52 is left open and contact 53 is connected to the upper terminal of the inductance 44. The upper terminals of the capacitor 46 is connected to the upper terminal of the variable resistor 33 and to the terminal 57. The lower terminal of the inductance 44 is connected to the lower terminal of the decade resistors 37 to 43 inclusive and to the terminal 59. The blade or contactor of the switch 45 is mechanically coupled to the blade or contactor of the switch 50 so that these two switches may be controlled together although they are electrically insulated from each other.

A switch 47 having the moveable contactor thereof electrically connected to the blade of the switch 45, is provided with a plurality of contacts arranged in parallel and connected to resistors 48 and 49. This switch selects the phase angle from 0° to 90° in 5° steps with the shunt resistors 48 and series resistors 49 as will be described in detail hereinafter. The bottom row of resistors 49 has the terminal 49a at one end thereof connected to the right hand side of the jack 34a and to the terminal 58. The left hand end 48a of the resistor series 48 is connected to the blade of the switch 50. This switch 50 is provided with three contacts 54, 55 and 56, contact 54 being connected to the terminal 57, to the upper terminal of the standard capacitor 46, to the upper terminal of the variable resistor 33 and to the right hand side of the capacitor 32. The contact 55 is left open and the contact 56 is connected to the terminal 59, to the lower end of the inductance 44 and to the lower terminal of the decade resistors 37 to 43 inclusive, as well as to the right hand terminal of the capacitor 35 and resistor 36.

In the bridge circuit of this invention, the standard arm including the tapped resistors 48 and 49, and either inductance 44 or capacitance 46, is made variable only in phase angle while the variable arm consisting of the variable resistor 33, is varied in magnitude only.

The phase of the standard arm is simply turned or adjusted to match any phase angle that the impedance being measured may have without changing the calibrations of the variable resistor 33. Any magnitude of the impedance being measured on the other hand may be matched, within the decade range of the bridge, by adjusting the resistor 33 to the correct magnitude.

Figure 2:
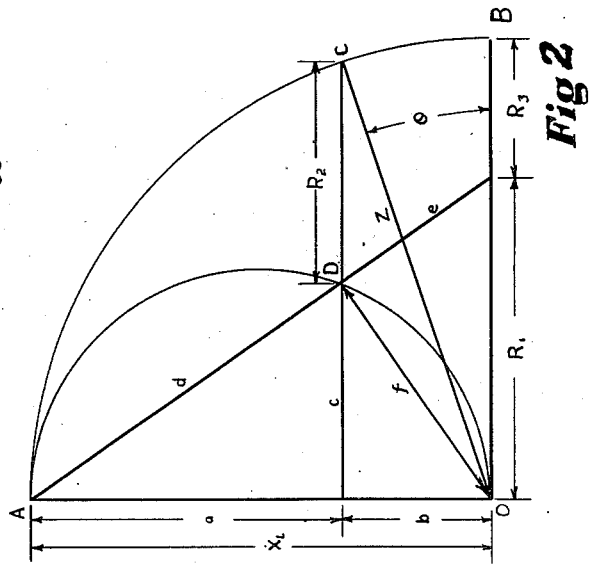
Figure 2 is a diagram to illustrate the phase relationships in the standard arm of the bridge.
Figure 4:
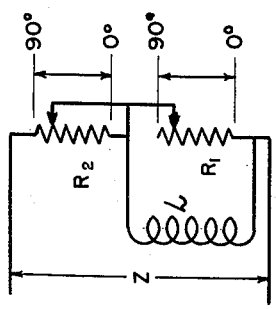
Figure 4 is a diagram employed for the purpose of explaining the operation of this invention.
Figure 3:
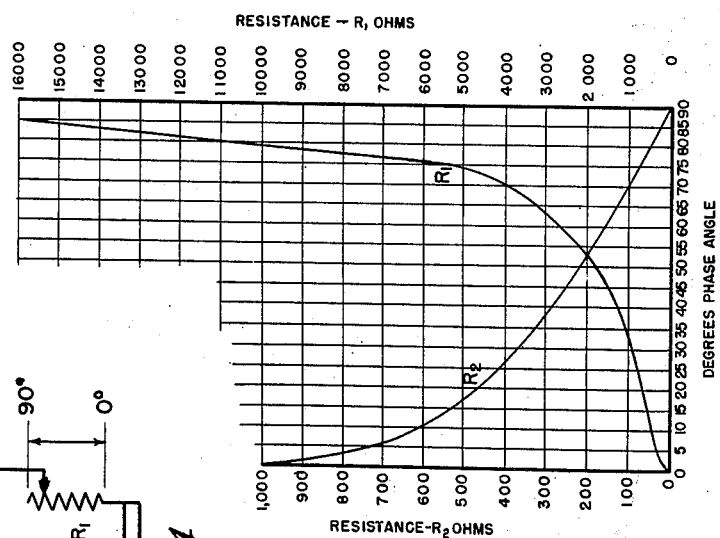
Figure 3 is a graph to be used in conjunction with Figure 4 in explaining the operation of this invention.

The derivation of a bridge arm which changes in phase angle only while maintaining constant absolute value of magnitude may be more readily understood by reference to Figs. 2, 3 and 4. In the quadrant AOB in which any phase angle can be varied from zero to +90 degrees, the impedance Z is shown equal in magnitude to $X_L$. At the intersection of Z with arc ACB, a horizontal line DC is drawn parallel to OB. This line extended to AO divides $X_L$ into segments $a$ and $b$, and intersects arc ADO at D. A and D are connected by line $d$ which is extended by line $e$ to OB. For any point such as D on the arc ADO, $d$ and $f$ form a right angle since they form a triangle inscribed in a semi-circle.

From this it is seen that $$c^2 = ab \text{ and } c = \sqrt{ab} \quad (1)$$

On a basis of $X_L$ = unity, it may be observed that $$b = \sin \theta \quad (2)$$

and also that $$a = (1 - \sin \theta) \quad (3)$$

To describe $c$ in terms of these functions Equations 2 and 3 may be substituted into (1), giving, $$c = \sqrt{\sin \theta (1 - \sin \theta)} \quad (4)$$

Since $R_1/X_L = c/a$, $R_1$ may be defined in these terms, namely $$R_1 = X_L c / a \quad (5)$$

And by substituting (3) and (4) into (5) the following is obtained:

$$R_1 = \frac{X_L \sqrt{\sin \theta (1 - \sin \theta)}}{1 - \sin \theta} \quad (6)$$

This gives a value $R_1$ that may be connected in shunt with $X_L$ to produce an impedance which when connected in series with a resistance $R_2$ forms an impedance Z.

It may be noted that, $$c + R_2 = \cos \theta, \text{ and } R_2 = \cos \theta - c \quad (7)$$

For actual values of $R_2$ in terms of the derived functions Equation 4 may be substituted in Equation 7 and inverted to give $$R_2 = X_L (\cos \theta - \sqrt{\sin \theta (1 - \sin \theta)}) \quad (8)$$

Values of $R_1$ and $R_2$ for $\theta$ from zero to 90 degrees were plotted, resulting in two curves as shown in Fig. 3. From these curves it is seen that a constant impedance with variable phase angle may be produced by a dual potentiometer, wired to an inductance L as shown in the schematic wiring diagram shown in Fig. 4. Since $R_1$ approaches infinity at 90 degrees it should be made to open at the 90 degree end that is, when the switch 47 engages contact 47a (Fig. 1). The graphs shown in Fig. 3 were obtained using a circuit such as illustrated in Fig. 4 that is equivalent to the standard arm of the bridge shown in Fig. 1 except that the standard arm of the bridge may employ either the inductance 44, corresponding to the inductance L of Fig. 4, with the resistors 48 connected across it when the switch 45 closes its circuit to the contact 53 and the switch 50 closes its circuit to the contact 56 or it may employ the capacitor 46 with the resistor 48 connected across the capacitor when the switch 45 contacts the post 51 and the switch 50 contacts the post 54. In each case the switch 47 opens the circuit between the resistors 48 and the inductance 44 or the capacitor 46 when this switch is in its extreme left hand position as illustrated in Fig. 1. Furthermore, as pointed out above, the resistors 49 are also included in the standard arm, these resistors corresponding to the resistor $R_2$ of Fig. 4.

For complete decade values throughout all ranges of the bridge the value of 1,000 ohms was chosen for the maximum value of the resistor 33. To reduce all values to one scale, the values of the inductive and capacitive reactances 44 and 46 respectively, were set at 1,000 ohms and so that capacitance and inductance values could be placed on the same scale the signal frequency was set at 1600 cycles at which a 0.1 microfarad capacitor has 1,000 ohms reactance, and a 0.1 henry inductance has a reactance of 1,000 ohms. Thus at one setting of the variable resistor 33 of the bridge the values of 0.1 henry, 0.1 microfarad, 1,000 ohms resistance or impedances of 1,000 ohms at any phase angle from $+90$ degrees to $-90$ degrees may be read.

Figure 5:
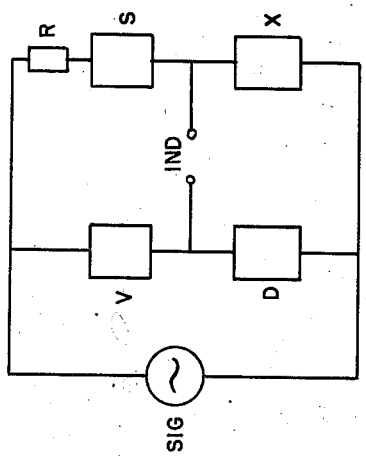
Figure 5 is another simplified schematic diagram employed for the purpose of setting forth the operation of this invention.

Since a suitable dual potentiometer was not available the resistors $R_1$ and $R_2$ (Fig. 2) were selected by a tap switch 47 using fixed resistors 49 and 48 as shown in Fig. 1. The values of these tapped resistors are such that the phase angle of the standard arm may be varied in 5 degree steps. By arranging the bridge as shown schematically in Fig. 5, it can be shown that $$X/S = D/V$$

and that $X = SD/V$.
Substituting capacitance values in place of reactances:

$$\frac{1}{2\pi f C_X} = \frac{D/2\pi f C_s}{V} \quad (9)$$

which yields $$C_x = \frac{V C_s}{D} \quad (10)$$

where
$C_x$ = unknown
$C_s$ = standard

Figure 6:
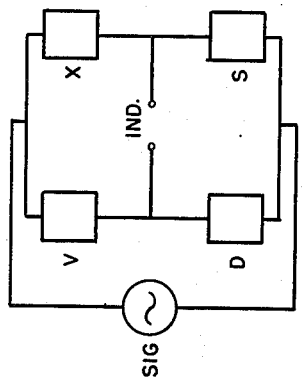
Figure 6 is a simplified schematic diagram of the impedance bridge.

This shows that for fixed values of $C_s$ (standard capacitor 46) and D (decade resistor, that is, one of the resistors 37 to 43), $C_x$ varies directly with V (variable resistor 33). However, for the measurement of impedances with positive phase angles, containing real or equivalent inductances the bridge is arranged as shown in Fig. 6. Here $X/S = V/D$ and $X = VS/D$. Since reactance and inductance are proportional, it is obvious that X varies directly with V, as S and D are constant. These two bridge connections are easily achieved by switching the arms from that of Fig. 5 to that of Fig. 6.

Figure 7:
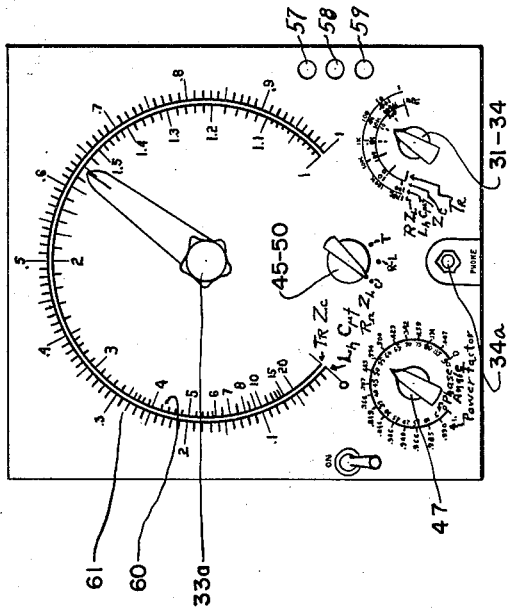
Figure 7 illustrates a view of the front of the panel of this device.

In the measurement of capacitance and impedances with negative phase angles, the device to be measured is connected with one terminal thereof to the terminal 58 and with the other terminal thereof to the terminal 59. The switches 45 and 50 are placed in their upper positions, that is, with the blade of the switch 45 contacting the terminal 51 and the blade of the switch 50 contacting the terminal 54. A pair of telephone receivers is plugged into the jack 34a so that the 1600 cycle current supplied to the bridge by the oscillator 18 and the amplifier 29 may produce a tone in the telephone receiver. The switch 47 is then adjusted until the phase angle of the standard arm including the capacitor 46 and resistors 48 and 49, is equal to that of the device being tested. These phase angles correspond when the volume of the signal heard in the telephone receiver is a minimum. Thereafter the value of the resistor 33 is adjusted until no signal is heard in the telephone receivers. If this balance cannot be obtained by varying the resistor 33 then resistors of other values must be selected from the decade resistors 37 to 43 inclusive by the switch 34 until such a balance can be obtained. The value of the impedance of the capacitive reactance may then be read in ohms from the scale 60 associated with the indicator 33a as shown in Figure 7. The capacitance of the capacitive reactance may be read simultaneously in microfarads from the scale 61 adjacent to the scale 60. The indicator 33a is mechanically connected to the variable resistor 33 and the knob associated with this indicator is used to adjust this variable resistor.

Substantially the same process is gone through in the measurement of resistance, inductance and positive phase angle impedances. For these measurements the switches 45 and 50 are placed in the lowermost positions, that is, the blade of the switch 45 contacts the terminal 53 and the blade of the switch 50 contacts the terminal 56. The resistance, inductance or positive phase angle impedance is connected between the terminals 57 and 59 of the instrument and the instrument is balanced as before. The values of resistance, inductance and positive phase angle impedance are read from the scale 61 shown in Fig. 7. It must of course be borne in mind that the readings from the scales 60 and 61 may have to be multiplied by suitable factors that are obtained from the scales associated with the switch 31—34 which controls the selection of the decade resistors 37 to 43 inclusive. The switch 31—34 has four scales associated with the control knob and pointer thereof and these scales are arranged in four arcs concentric with the knob. The upper scale is designated by the legends R and $Z_L$ indicating that this scale supplies the factors for multiplying the readings from scale 61 when the values of resistance or inductive or positive impedance are being measured. The next scale is designated $L_h$ and $C_{\mu f}$ indicating that this scale supplies the factor for multiplying the readings from scale 61 when values of inductance in henrys or capacitance in microfarads are desired. The third scale is designated by the legend $Z_c$ and factors for multiplying readings of the scale 60 are obtained from this third scale when negative impedance is being measured. The fourth scale is designated by the legend T_R and factors are obtained from this scale for multiplying the readings of scale 60 when transformer ratios are being determined with this apparatus as will be described hereinafter.

Transformer ratios may also be measured with this device. The measurement of transformer ratios is however, accurate only where the power factors of the windings are the same and a difference in power factors between windings will make a corresponding difference in turns ratio to voltage ratio. In practice it has been found that loading of the transformer by the bridge arms during measurement is large compared to the internal losses so that the windings present a very nearly equal power factor to the bridge and excellent balance can be achieved with practically any transformer used in electronics apparatus up to a ratio of 1 to 200.

In the measurement of transformer ratios the switches 45 and 50 are placed in their open positions and the transformer windings are connected to all three terminals 57, 58 and 59, the terminal 58 being common to the primary and secondary. Since the standard arm is not used in the measurement of transformer ratios this measurement is obtained simply by balancing the variable resistor 33 against the decade resistors 37 to 43 inclusive to obtain a balance and the transformer ratio is read from the scale 60 shown in Figure 7.

Various modifications may be made in this apparatus, for example the specific type of oscillation generator illustrated may be replaced by a tuning fork or magnetostriction element controlled type of oscillation generator and the oscillation generator as well as parts of the bridge may be arranged in a suitable temperature regulated cabinet provided with suitable electrical heating elements to increase the accuracy of the instrument. Furthermore, as previously mentioned the anodes and cathodes of the tubes 18 and 29 may be supplied from batteries to make the instrument entirely portable. Employing batteries for the anode supply would dispense with the rectifier 11, capacitor 12 and resistor 13 and employing batteries for heating the cathodes would dispense with the transformer 15.

While I have described this invention in detail with respect to certain modifications thereof, it is of course, to be understood that I do not desire to limit this invention to the exact details described and illustrated except insofar as they are defined by the following claims.

I claim:

1. A bridge circuit for measuring absolute values of impedances comprising a decade impedance arm, a variable impedance arm, a standard impedance arm comprising a reactive impedance, a first variable resistor connected across said reactive impedance and a second variable resistor connected in series with said reactive impedance, terminals to which the unknown impedance is to be connected to form the fourth arm of the bridge circuit, a manual control for varying said variable impedance arm to balance the impedance of the unknown impedance, means for simultaneously increasing said first variable resistor and decreasing said second variable resistor or vice versa to adjust the phase angle of said standard arm to match the phase angle of the unkown impedance, and a set of scales associated with said manual control from which the value of the unknown impedance may be obtained when the bridge circuit is balanced.

2. A bridge circuit for measuring absolute values of impedances comprising a decade impedance arm, a variable impedance arm, a standard impedance arm comprising a reactive impedance, a first variable resistor connected across said reactive impedance and a second variable resistor connected in series with said reactive impedance, terminals to which the unknown impedance is to be connected to form the fourth arm of the bridge circuit, means for varying said variable impedance arm to balance the impedance of the unknown impedance, and means for simultaneously increasing said first variable resistor and decreasing said second variable resistor or vice versa to adjust the phase angle of said standard arm to match the phase angle of the unkown impedance.

3. A bridge circuit for measuring absolute values of impedances comprising a decade impedance arm, a variable impedance arm, a standard impedance arm comprising a reactive impedance, a first variable resistor connected across said reactive impedance and a second variable resistor connected in series with said reactive impedance, terminals to which the unknown impedance is to be connected to form the fourth arm of the bridge circuit, means for varying said variable impedance arm to balance the impedance of the unknown impedance, means for varying said first and said second variable resistors to adjust the phase angle of said standard arm to match the phase angle of the unknown impedance, and means for opening the circuit of said first variable resistor when the phase angle of said standard arm approaches 90 degrees.

4. A bridge circuit adapted to measure absolute values of impedance comprising a decade impedance arm, a variable impedance arm, means for connecting an impedance to be measured as the unkown arm of the bridge circuit, a standard arm comprising a first variable resistor and a second variable resistor, a capacitor element and an inductance element and switch means for selecting and connecting one of said elements into said standard arm and for connecting said first variable resistor in series with said selected element and for connecting said second variable resistor in parallel with said selected element, means for simultaneously increasing said first variable resistor and decreasing said second variable resistor or vice versa to adjust the phase angle of said standard arm to match the phase angle of the unknown impedance, a manual control for said variable impedance arm, a scale associated with said manual control, and a source of pulsating voltage supply for the bridge circuit, the frequency of said pulsating voltage, the maximum value of said variable impedance arm, the value of said capacitor and the value of said inductance being such that values of resistance, inductance, capacitance and inductive impedance in the unkown arm may be obtained from said scale when the bridge circuit is balanced.

HENRY K. BRADFORD.

REFERENCES CITED

The following references are of record in the file of this patent:

UNITED STATES PATENTS

| Number | Name | Date |
| --- | --- | --- |
| 1,847,127 | Mayer | Mar. 1, 1932 |